(12) United States Patent
Master et al.

(10) Patent No.: US 7,046,635 B2
(45) Date of Patent: May 16, 2006

(54) SYSTEM FOR AUTHORIZING FUNCTIONALITY IN ADAPTABLE HARDWARE DEVICES

(75) Inventors: Paul L. Master, Sunnyvale, CA (US); John Watson, Edgewood, WA (US)

(73) Assignee: Quicksilver Technology, Inc., San Jose, CA (US)

( * ) Notice: Subject to any disclaimer, the term of this patent is extended or adjusted under 35 U.S.C. 154(b) by 880 days.

(21) Appl. No.: 09/998,006

(22) Filed: Nov. 28, 2001

(65) Prior Publication Data

US 2003/0099252 A1 May 29, 2003

(51) Int. Cl.
*G08C 15/00* (2006.01)
*H04B 1/40* (2006.01)

(52) U.S. Cl. .................................. 370/241; 455/74
(58) Field of Classification Search ............. 370/241, 370/335, 342; 455/74
See application file for complete search history.

(56) References Cited

U.S. PATENT DOCUMENTS

| | | | | |
|---|---|---|---|---|
| 5,335,276 A | * | 8/1994 | Thompson et al. | 380/266 |
| 5,530,964 A | * | 6/1996 | Alpert et al. | 717/158 |
| 5,630,206 A | * | 5/1997 | Urban et al. | 455/456.1 |
| 5,884,284 A | * | 3/1999 | Peters et al. | 705/30 |
| 5,987,611 A | * | 11/1999 | Freund | 713/201 |
| 6,192,255 B1 | * | 2/2001 | Lewis et al. | 455/558 |
| 6,718,182 B1 | * | 4/2004 | Kung | 455/556.1 |
| 6,748,360 B1 | * | 6/2004 | Pitman et al. | 704/270 |
| 6,766,165 B1 | * | 7/2004 | Sharma et al. | 455/423 |
| 6,832,250 B1 | * | 12/2004 | Coons et al. | 709/224 |

OTHER PUBLICATIONS

World Wide Web, http://web.archive.org/web/20000229192734/www.gateway.com/productpages/9300splash/index.shtml, Gateway.com, available on Mar. 3, 2000, 1 page.*

* cited by examiner

*Primary Examiner*—Chi Pham
*Assistant Examiner*—Kerri M. Dyke
(74) *Attorney, Agent, or Firm*—Charles J. Kulas; Trellis Intellectual Property Law Group, PC

(57) ABSTRACT

A system for authorizing new or ongoing functional use of an adaptable device. The device generates usage information including the times that the device is used, types of functionality provided, indication of amount and type of resources used, and other information. The usage information is transmitted back to a controlling entity, such as an original manufacturer of the adaptable device. The controlling entity can act to enable or prevent use of the provided functionality, as desired. Part of the requirement for using functionality can be monetary, by predetermined agreement, or by other criteria.

2 Claims, 3 Drawing Sheets

SYSTEM FOR AUTHORIZING FUNCTIONALITY IN ADAPTABLE HARDWARE DEVICES

CROSS-REFERENCE TO RELATED APPLICATIONS

This application is related to co-pending U.S. patent application Ser. No. 09/815,122, filed on Mar. 22, 2001, entitled "ADAPTIVE INTEGRATED CIRCUITRY WITH HETEROGENEOUS AND ADAPTABLE MATRICES OF DIVERSE AND ADAPTIVE COMPUTATIONAL UNITS HAVING FIXED, APPLICATION SPECIFIC COMPUTATIONAL ELEMENTS" which is hereby incorporated by reference as if set forth in full in this document.

BACKGROUND OF THE INVENTION

This invention relates in general to monitoring functionality in adaptable devices and more specifically to a system for authorizing, in an ongoing manner, users and other entities for activity in association with a highly adaptable hardware device.

Traditional consumer electronic devices have substantially fixed functionality. Devices such as cell phones, digital audio players, personal digital assistants (PDAs), global positioning satellite (GPS) terminals, etc. are designed from scratch and manufactured and marketed as a specific type of device with a specific feature set. Traditionally, once a consumer purchases a hardware device the original manufacturer of the device has no further control over the device and can not receive additional revenue based on a consumer's use of the device. While this approach has worked well for non-adaptable, "fixed function," devices, such an approach suffers from several drawbacks in the case where highly adaptable consumer devices are developed and marketed.

This approach is adequate where a device's functionality is "fixed" or not capable of substantially changing. However, recent developments are providing more flexible consumer devices where the device's feature set, data formats, communication protocols, etc. can be greatly modified after sale by the use of software or other information. Such modification can potentially be so extreme as to change the consumer's concept of the device so that it is no longer even considered to be the same device. Thus, it is desirable to provide a mechanism whereby a manufacturer, or other entity, has more opportunities to obtain revenue and profit from the creation and support of the devices, and associated hardware and software.

SUMMARY OF THE INVENTION

The present invention provides a system for authorizing new or ongoing functional use of an adaptable, or configurable, device. The device generates usage information including the times that the device is used, types of functionality provided, indication of amount and type of resources used, and other information. The usage information is transmitted back to a controlling entity, such as an original manufacturer of the adaptable device. The controlling entity can act to enable or prevent use of the provided functionality, as desired. Part of the requirement for using functionality can be monetary, by predetermined agreement, or by other criteria.

In one embodiment the invention provides a method for authorizing the use of an adaptable device. The method includes detecting that the adaptable device is adapted to perform a first type of operation at a first point in time; detecting that the adaptable device is adapted to perform a second type of operation at a second point in time; and using the detected adaptations to determine whether to authorize the continued use of the device.

DESCRIPTION OF A PREFERRED EMBODIMENT

The present invention allows for monitoring and controlling adaptable devices after the point of sale. Examples of a preferred type of adaptable device is described in the above-referenced co-pending patent application. Although the invention is discussed herein with respect to specific device types, it should be clear that aspects of the invention include any type of adaptable device, using any type of architecture, adaptation method, adaptation information transfer systems, adaptation data format, etc.

Figure 1:
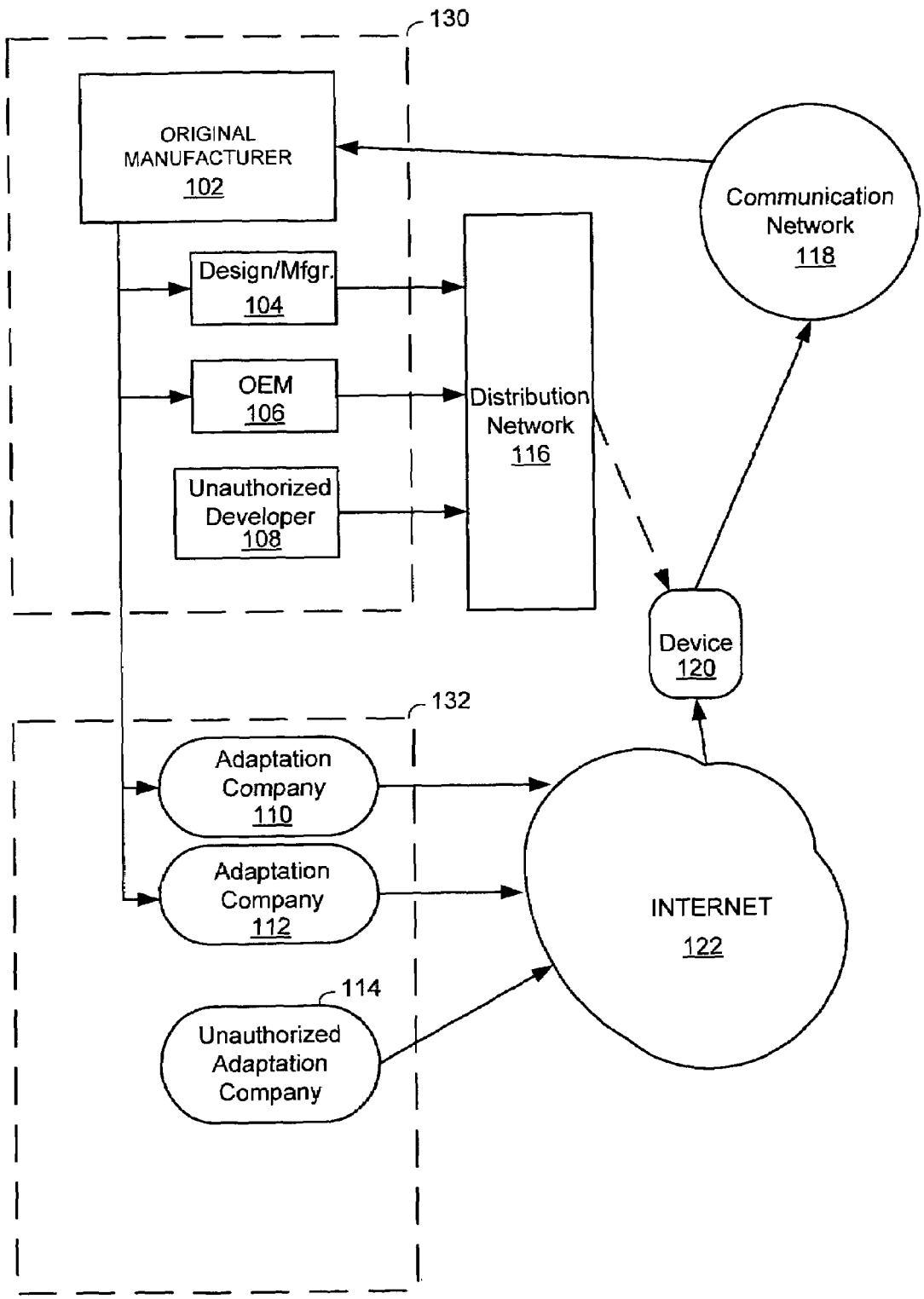
FIG. 1 illustrates typical entities involved in the development, sale, distribution and adaptation of a adaptable device.

FIG. 1 illustrates typical entities involved in the development, sale, distribution and adaptation of a adaptable device.

In FIG. 1, box 130 illustrates entities involved with hardware aspects of the device while box 132 illustrates entities involved with software, or "adaptation information," aspects of the device. Original manufacturer 102 is the primary developer of the adaptable device. As such, original manufacturer 102 desires to obtain as much revenue as possible from all entities who stand to gain, or benefit from, use and sale of the device or of additional hardware and information related to the device. Note that although the system of the present invention is discussed primarily with respect to obtaining revenue and profits for the original manufacturer, that any entity in FIG. 1 (and other entities, not shown) can obtain revenue benefits using features of the present invention.

Original manufacturer 102 can sell, rent, lease, license or otherwise deliver, device 120 to an end user. A preferred embodiment of the invention licenses the use of the hardware device, or resources in the hardware device. Such licensing can be by possession of the device over time, dependent on machine cycles, features used, input/output (I/O) rate or amount, memory activity or utilization, energy use, bus utilization, or any other performance measurement. This ability of the original manufacturer to receive one or more payments after sale of the device, where the payments are dependent upon a degree of possession or use of the device, provides distinct commercial advantages to one or more entities involved, including the end user.

Returning to FIG. 1, delivery of the physical adaptable device can be through normal retail distribution networks such as store sales, internet sales, mail order, telephone order, etc, as represented by distribution network 116. Original manufacturer 102 can license or sell components or hardware technology to designer 104 or original equipment manufacturer (OEM) 106, or other entities (not shown). The commercial aspects of selling or licensing hardware to end users, or to affiliated developers or business partners is well-known and any traditional, or future, development, sales, and distribution methods can be employed.

Unauthorized developer 108 is a hardware manufacturer that operates without authority from original developer 102. However, because the device (or components) are physical, such unauthorized action is relatively easy to detect and police by using traditional laws and regulation methods.

Box 132 represents the "software" aspect of the adaptable device. As mentioned, device 120 is so highly adaptable that it can be readapted not only with extremely diverse features, but it can also be readapted to become a completely different functional device. For example, formats can be changed so that a device adapted as a code division multiple access (CDMA) cell phone can become a time-division multiple access (TDMA) cell phone by downloading adaptation information from adaptation companies such as 110 or 112 through a communications link such as internet 122. Other formats and/or protocols are possible such as voice over internet protocol (VoIP), traditional radio frequency transmission, etc. The device itself can be changed so that it is no longer a cell phone, but becomes a different device, or combination of what are today considered different devices. For example, the device can be readapted to be a media playback device, database device, web browser, digital satellite radio, etc.

Within a given device type there may be multiple formats, protocols, or other data or transmission type differentiations that make device types incompatible with each other or with certain data. For example, audio media players may be mp3, RealAudio, Media Player, .wav or other formats. Digital video players may include MPEG, .mov, .avi, and other formats. A highly adaptable device is able to perform functions so that the same physical device can be adapted to be any device type, and to handle any function or operation among different data and transmission formats within a device type. The physical device type can be a hand-held unit, set top box, car mounted, etc.

Adaptation companies 110 and 112 can receive payment from an end user of device 120 by means as is known in the art. For example, the adaptation information can be downloaded as shareware, trialware, a standard software product, etc. The adaptation information can also be licensed. Alternatively, payments to the adaptation companies can come from original manufacturer 102 while the original manufacturer obtains revenue with one of the approaches described, below.

Unauthorized adaptation company 114 represents an entity producing adaptation information without approval (or not under the control of) original manufacturer 102. Such unauthorized software-type distribution is extremely difficult to police and control because of the amorphous, complex and world-wide nature of Internet 122, typically used as the distribution mechanism.

However, a preferred embodiment of the invention allows the original manufacturer to receive revenue from any use of the device regardless of whether an authorized, or unauthorized, adaptation company has sold a "virtual device" (i.e., adaptation information that defines a new feature or device) to an end user. The preferred embodiment allows the device to send "usage information" from device 120 to original manufacturer 102 via communication network 118. Communication network 118 can be any type of network such as the Internet, satellite, radio-frequency broadcasts, the cellular network, a cable network, POTS telephone network, etc. The types of usage information are next presented.

Device 120 can be any type of adaptable device created using any type of architecture or design methodology, such as a device using a general-purpose processor, multiprocessing, application-specific integrated circuit (ASIC), field-programmable gate array (FPGA), dedicated circuitry, etc., or combination of the foregoing. A preferred embodiment of the invention uses an adaptive computing engine (ACE) which is more fully described in the co-pending patent application referenced above. For purposes of illustration, the features of the present invention are next presented with respect to two specific architectures, namely (1) a general-purpose processor architecture and (2) the ACE architecture. However, it should be apparent that any type of adaptable hardware device design is adaptable for use with the present invention.

Figure 2:
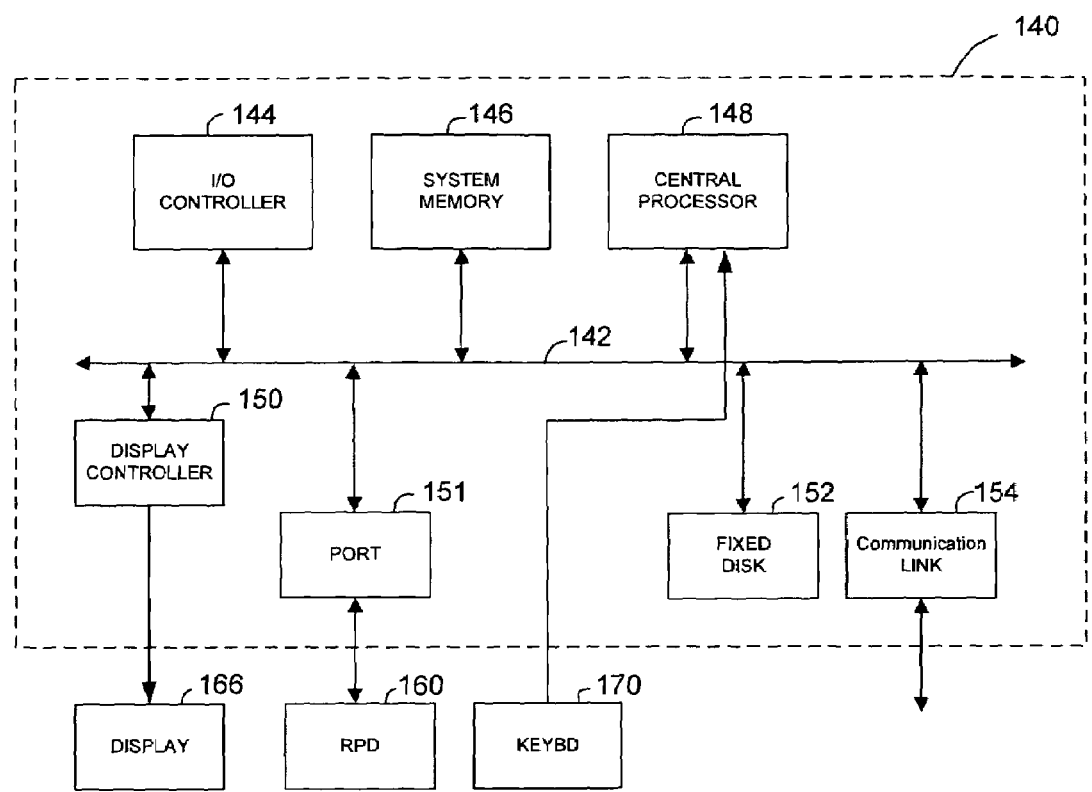
FIG. 2 illustrates a general-purpose processor type of adaptable device.

FIG. 2 illustrates a general-purpose processor type of adaptable device.

In FIG. 2, subsystems within device 140 typically communicate over a system bus such as bus 142. Additional buses or data transfer links can be used, such as dedicated signal wires, etc. Subsystems include input/output (I/O) controller 144, System Memory (or random access memory "RAM") 146, central processing unit CPU 148, Display Controller 150, Serial Port 150, Fixed Disk 152, and Communication Link 154. Communication Link 154 allows the device to transfer data with an arbitrary external device, network or other communication system such as the Internet. Typically, adaptation information in the form of software can be loaded into the device through the communication link. Other ways to reconfigure the device include using removable media such as magnetic disks, compact disk read-only memory (CDROM), media cards, etc.

Bus 142 allows each of the subsystems to transfer data among other subsystems and, most importantly, with the CPU. External devices can communicate with the CPU or other subsystems via bus 142 by interfacing with a subsystem on the bus. Thus, Display 166 communicates with Display Adapter 150, a relative pointing device (RPD, e.g. a mouse) connects through Port 160, etc. Some devices such as Keyboard 170 can communicate with the CPU by direct means without using the main data bus as, for example, via an interrupt controller and associated registers (not shown). Any manner of user controls can be employed.

The present invention allows monitoring of various performance aspects, resource utilization and other indicators of use of the adaptable device. Any information, used to indicate the extent or type of use of an adaptable device is referred to herein as "usage information" or "usage parameters".

One type of usage information includes using identification tags. An identification tag is an electronic signal sent via the communication link to the original manufacturer or another entity for purposes of monitoring usage. Each tag can be a unique identifier to indicate a type of functionality, feature, type of device adaptation, or other indication of usability of the device. In a preferred embodiment, the tags and a device identification are received by an authorizing entity. The device must receive an authorization code from the authorization entity before using, or in order to continue to use, the type of function indicated by the tag. Such authorization can be sent periodically to continue allowing the device to perform the functionality. Authorization can be based on a payment schedule, purchaser agreement, or some other criteria.

Other types of usage information measure performance or resource utilization of the device. For example, processor speed, number of cycles, or clock "on" time can be measured. This is not only an indication of how long the device is on, or being used, but also can indicate how much processing the device is performing.

Since many cycles are "idle" in a typical processor, other operations such as rate of instruction execution and type of instructions executed can be detected. For example, one approach is to sample the processing occurring at relatively long intervals, such as once per 500 mS. If digital signal processing (DSP) is occurring frequently then a higher charge can be applied to the device owner's account because DSP processing is a likely indicator of a high-level device operation. A high-level device such as a cell phone, media playback device, etc., would use DSP operations more frequently as opposed to standard logic and arithmetic functions in more basic devices such as an address book or web browser. A counter can be integrated into the central processing unit to increment when a complex (or other predetermined) instruction is executed. The counter value can be sampled at intervals.

Use of system resources is another type of usage information, or usage parameter, that can be the basis for payment charges, user accounting, monitoring or other purposes. For example, the rate of memory accessing, average or maximum memory utilization, I/O use by one or more ports, buses, communication links, etc., can be measured and used as usage information. As is discussed next, the preferred architecture (as opposed to a general purpose processor approach) allows more precise determination of usage information based on minute functionality or performance of an adaptable device.

Authorization codes can be keyed to enable only specific devices. Such an approach can use keyed encryption schemes, or other methods, as is known in the art. Authorization can be used to allow the user to use the device, or a portion of the device's functionality, for a period of time. Authorized use can be measured in other ways as, for example, by providing limitations on resources such as processing time, memory use, number or type of instruction or operations allowed, or any other type of device resource.

Figure 3:
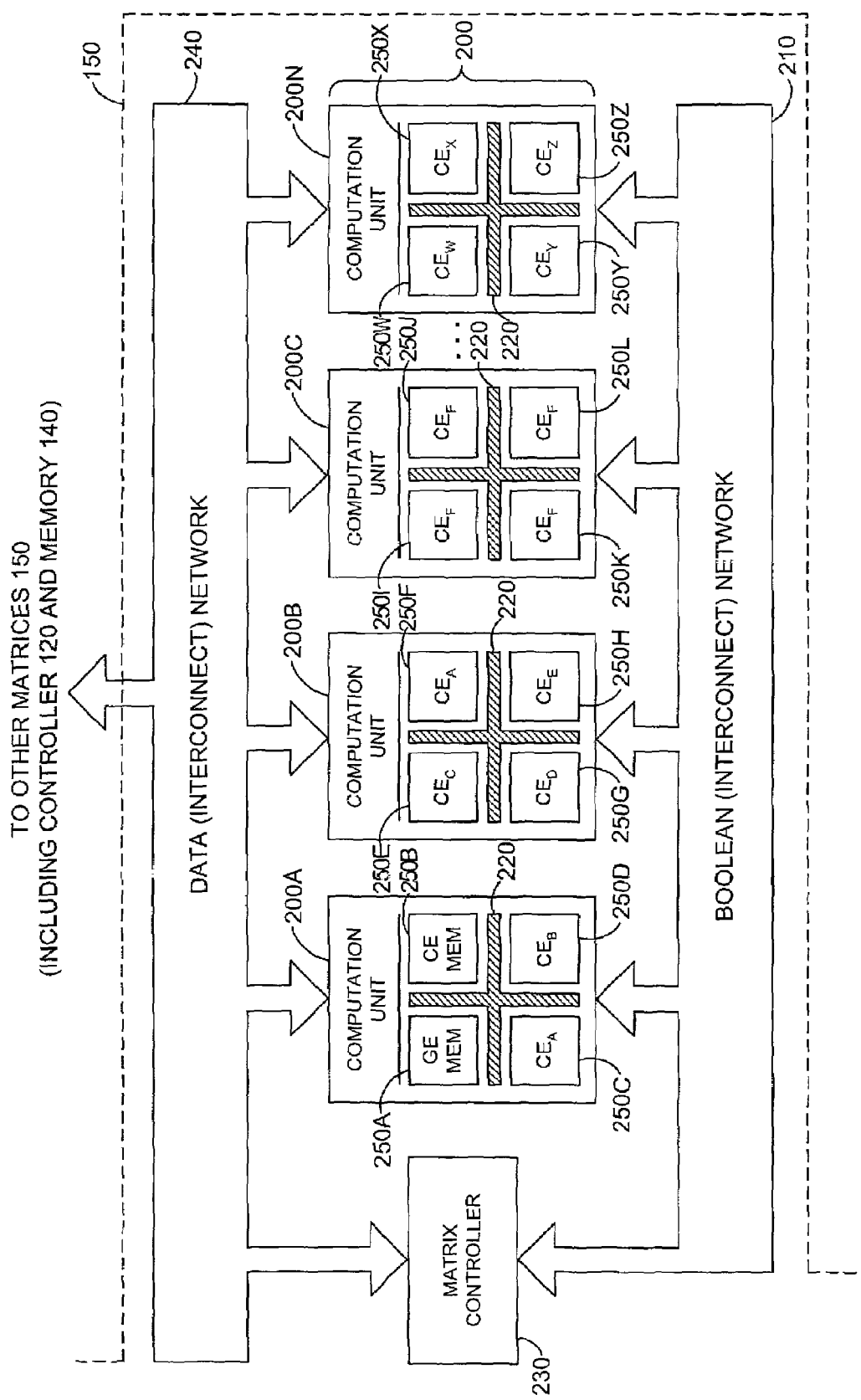
FIG. 3 illustrates basic parts of an adaptable device architecture based on an adaptive computing environment.

FIG. 3 illustrates basic parts of an adaptable device architecture based on an adaptive computing environment (ACE) approach. Such an approach is discussed in detail in the co-pending patent application referenced, above. The ACE architecture uses small processing elements called nodes, or matrices. The matrices are each designed to be specialized in one basic type of processing such as arithmetic, bit manipulation, finite state machine, memory oriented or reduced instruction set computing (RISC) approaches. The matrices are provided with adaptable interconnection networks. A scheduler performs the task of mapping an operation, or function, onto the matrices. Once mapped, the function can execute for a while before a next function is mapped onto the same set of matrices. In this manner, the functionality of a device that includes the matrices can be changed quickly and efficiently.

In FIG. 3, adaptable matrix 150 includes a plurality of computation units 200 (illustrated as computation units 200A through 200N). Computation units include a plurality of computational elements 250 (illustrated as computational elements 250A through 250Z). As illustrated in FIG. 3, matrix 150 generally includes a matrix controller 230 and plurality of computation (or computational) units 200 as logical or conceptual subsets or portions of a matrix interconnect network. Also shown are data interconnect network 240 and Boolean interconnect network 210. Interconnect networks can have different levels of interconnectivity and flexibility for greater levels of adaptability and adaptation. In an applied architecture, the matrix represented by FIG. 3 is replicated within a single chip, or chipset, and interconnected with each other to provide a scalable approach to providing processing resources. A network interconnecting matrices (not shown) is referred to as a matrix interconnection network.

Boolean interconnect network 210 provides adaptation and data interconnection capability between and among the various computation units 200, and is preferably small (i.e., only a few bits wide). Data interconnect network 240 provides the adaptation and data interconnection capability for data input and output between and among the various computation units 200, and is preferably comparatively large (i.e., many bits wide). It should be noted, however, that while conceptually divided into adaptation and data capabilities, any given physical portion of the matrix interconnection network, at any given time, may be operating as either the Boolean interconnect network 210, the data interconnect network 240, the lowest level interconnect 220 (between and among the various computational elements 250), or other input, output, or connection functionality.

Continuing to refer to FIG. 3, included within a computation unit 200 are a plurality of computational elements 250, illustrated as computational elements 250A through 250Z (individually and collectively referred to as computational elements 250), and additional interconnect 220. The interconnect 220 provides the adaptable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be adaptably connected together into adaptive and varied computational units 200, which also may be further readapted and interconnected, to execute an algorithm or other function, at any given time, utilizing the interconnect 220, the Boolean network 210, and the matrix interconnection network (not shown).

In a preferred embodiment, the various computational elements 250 are designed and grouped together, into various adaptive and adaptable computation units 200. In addition to computational elements 250 which are designed to execute a particular It algorithm or function, such as multiplication or addition, other types of computational elements 250 are also utilized. As illustrated in FIG. 3, computational elements 250A and 250B implement memory, to provide local memory elements for any given calculation or processing function (compared to more "remote" or auxiliary memory that can be external to the matrix). In addition, computational elements 250I, 250J, 250K and 250L are adapted to implement finite state machines to provide local processing capability especially suitable for complicated control processing.

With the various types of different computational elements 250 that may be available, depending upon the desired functionality, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3, particularly useful for complicated control sequences, dynamic scheduling, and input/output management, while a fourth type may implement memory and memory management, such as computation unit 200A. Lastly, a fifth type of computation unit 200 may be included to perform bit-level manipulation, such as for encryption, decryption, channel coding, Viterbi decoding, and packet and protocol processing (such as Internet Protocol processing).

In addition to the ways of determining functionality for general-purpose processing devices, as described above, the functionality of a device using the ACE architecture can be determined by adaptation information that is used to schedule operations on the computation units. Usage information can include the availability, types and frequency of use of different computation units. Adaptation of the interconnect network, number of active computation units over time, rate of execution of operations, etc., can all be used as usage parameters.

Although the invention has been described with respect to specific embodiments, the embodiments are merely illustrative, and not restrictive, of the invention. For example, the specific adaptable device designs presented herein can be greatly modified without departing from the scope of the invention. Subsystems, components or devices other than those shown can be added, modified or removed from the designs. Similarly, entities can be added to, or removed from the diagram of FIG. 1, depicting the operation and method of the present invention. In general, the advantages of the present invention can be realized with many different types of entities playing different roles and having different relationships to each other than those shown in FIG. 1.

Note that traditional forms of selling, renting, leasing, or contractual or licensing arrangements for the use of adaptable devices are possible. Such traditional terms can incorporate the approach of the present invention to monitor usage information and to authorize functionality, use of resources, etc.

Thus, the scope of the invention is to be determined solely by the appended claims.

What is claimed is:

1. A method for authorizing the use of a configurable device, the method comprising:
   detecting that the configurable device is configured to perform a first type of operation at a first point in time;
   detecting that the configurable device is configured to perform a second type of operation at a second point in time;
   using the detected configurations to determine whether to authorize the continued use of the device, wherein the detecting steps include the substep of
   receiving usage information from the device;
   wherein the usage information includes information about resources that the device has used, and wherein a resource includes instruction type.

2. A method for authorizing the use of a configurable device, the method comprising:
   detecting that the configurable device is configured to perform a first type of operation at a first point in time;
   detecting that the configurable device is configured to perform a second type of operation at a second point in time;
   using the detected configurations to determine whether to authorize the continued use of the device, wherein the detecting steps include the substep of
   receiving usage information from the device;
   wherein the usage information includes information about resources that the device has used, and wherein a resource includes instruction execution frequency.

* * * * *